(12) United States Patent
Stingelin et al.

(10) Patent No.: US 10,001,392 B2
(45) Date of Patent: Jun. 19, 2018

(54) MAGNETO-INDUCTIVE FLOW MEASURING DEVICE

(71) Applicant: Endress + Hauser Flowtec AG, Reinach (CH)

(72) Inventors: Simon Stingelin, Zullwil (CH); Thomas Budmiger, Ettingen (CH)

(73) Assignee: Endress + Hauser Flowtec AG, Kagenstr. 7, Reinach (CH)

( * ) Notice: Subject to any disclaimer, the term of this patent is extended or adjusted under 35 U.S.C. 154(b) by 556 days.

(21) Appl. No.: 14/418,176

(22) PCT Filed: Jul. 26, 2013

(86) PCT No.: PCT/EP2013/065778
§ 371 (c)(1),
(2) Date: Jan. 29, 2015

(87) PCT Pub. No.: WO2014/026841
PCT Pub. Date: Feb. 20, 2014

(65) Prior Publication Data
US 2015/0260555 A1    Sep. 17, 2015

(30) Foreign Application Priority Data
Aug. 16, 2012  (DE) ........................ 10 2012 107 534

(51) Int. Cl.
*H01H 47/28* (2006.01)
*H01H 47/32* (2006.01)
(Continued)

(52) U.S. Cl.
CPC ................ *G01F 1/586* (2013.01); *G01F 1/58* (2013.01); *G01F 1/60* (2013.01)

(58) Field of Classification Search
USPC .......................................................... 361/187
See application file for complete search history.

(56) References Cited

U.S. PATENT DOCUMENTS 3,852,646 A    12/1974  Mason
3,967,139 A *  6/1976  Johnson .............. G11C 11/4096
                                                    326/76
(Continued)

FOREIGN PATENT DOCUMENTS

CN        101057125 A    10/2007
CN        102393225 A     3/2012
(Continued)

OTHER PUBLICATIONS

English Translation of the International Preliminary Report on Patentability, WIPO, Geneva, CH, dated Feb. 26, 2015.
(Continued)

*Primary Examiner* — Thienvu Tran
*Assistant Examiner* — Lucy Thomas
(74) *Attorney, Agent, or Firm* — Bacon & Thomas, PLLC

(57) ABSTRACT

A magneto-inductive flow measuring device including a coil arrangement and a circuit for controlling a supply voltage of the coil arrangement. The circuit is designed to provide the supply voltage of the coil arrangement with a voltage curve sequenced as follows: A) the voltage rises from a starting voltage I up to an overvoltage II; B) in given cases, the voltage is held at the overvoltage II; C) the voltage falls from the overvoltage II down to a holding voltage V. The circuit controls the fall of the voltage from the overvoltage down to the holding voltage by tuning the voltage to at least two or more predetermined, intermediate, desired values III, IV.

13 Claims, 3 Drawing Sheets

(51) Int. Cl.
*G01F 1/58* (2006.01)
*G01F 1/60* (2006.01)

(56) References Cited

U.S. PATENT DOCUMENTS

| | | | |
|---|---|---|---|
| 4,784,000 A | 11/1988 | Gaertner | |
| 4,916,381 A | 4/1990 | Gelecinskyj | |
| 6,697,742 B1* | 2/2004 | Franklin | G01D 18/00 |
| | | | 702/100 |
| 6,763,729 B1 | 7/2004 | Matzen | |
| 7,260,486 B2* | 8/2007 | Budmiger | G01F 25/0007 |
| | | | 702/100 |
| 7,836,779 B2 | 11/2010 | Rasmussen | |
| 2008/0290866 A1* | 11/2008 | Cuffe | G01N 27/9046 |
| | | | 324/233 |
| 2012/0279584 A1* | 11/2012 | Broker | F23N 1/002 |
| | | | 137/487.5 |

FOREIGN PATENT DOCUMENTS

| | | |
|---|---|---|
| DE | 3213163 A1 | 10/1983 |
| DE | 102004046238 A1 | 3/2006 |
| EP | 0969268 A1 | 1/2000 |
| EP | 1460394 A2 | 9/2004 |
| WO | 2006032612 A1 | 3/2006 |

OTHER PUBLICATIONS

German Search Report, German PTO, Munich, dated Apr. 15, 2013.
International Search Report, EPO, The Netherlands, dated Oct. 18, 2013.

* cited by examiner

MAGNETO-INDUCTIVE FLOW MEASURING DEVICE

TECHNICAL FIELD

The present invention relates to a magneto-inductive flow measuring device.

BACKGROUND DISCUSSION

It is known that a magnetic field of a magneto-inductive flow measuring device is produced by a clocked direct current of alternating polarity. This assures a stable zero-point and makes the measuring insensitive to influences of multiphase materials, in homogeneities in the liquid or low conductivity. In such case, methods are known, with which the coil arrangement can be operated. These methods have already led to improvement for time efficient operation of the coil arrangement.

In known methods, for example in European patent, EP 1 460 394 A2, the supply voltage is controlled by direct reversing of an applied overvoltage down to a holding voltage. This direct reversing has, however, the result that eddy-currents are induced, which oppose a fast reverse poling of the magnetic field.

SUMMARY OF THE INVENTION

It is an object of the present invention to provide a flow measuring device, which enables an attenuation of eddy currents.

The present invention achieves this object by a magneto-inductive flow measuring device includes a coil arrangement and a circuit for controlling a supply voltage of the coil arrangement, wherein the circuit is designed to provide the supply voltage of the coil arrangement with a voltage curve sequenced as follows:
A) the voltage rises from a starting voltage up to an overvoltage;
B) in given cases, the voltage is held at the overvoltage;
C) the voltage falls from the overvoltage down to a holding voltage;
wherein the circuit controls the fall of the voltage from the overvoltage down to the holding voltage by tuning the voltage to at least two or more predetermined, intermediate, desired values.

Other than in the case of the previous direct reversing of the overvoltage to the holding voltage, the voltage in the region of the fall from the overvoltage down to the holding voltage visits here a number of intermediate values before reaching the holding voltage. By this controlling of the voltage, the occurrence of eddy currents can be lessened at least significantly.

It is advantageous, when the circuit controls the fall of the voltage from the overvoltage down to the holding voltage by tuning the voltage to at least five, preferably at least ten, predetermined, intermediate, desired values. The guiding of the voltage can also utilize more than 200 intermediate desired values. Theoretically, even two intermediate desired values are sufficient to achieve a measurable effect as regards eddy current attenuation. In order, however, for simply embodied circuits to achieve a satisfactory eddy current attenuation, however, at least 5 intermediate desired values should be predetermined, preferably, to the extent that the circuit permits, at least 10 intermediate desired values should be used for controlling the fall of the voltage.

The particular time interval for a controlled fall to the holding voltage depends on, among other things, the nominal diameter of the measuring tube. In such case, a compromise must be reached between the time, which the controlling of the decrease to the holding voltage requires for minimizing eddy-currents and the time, in which the magnetic field should lastly reach the end value. In this connection, it has been found to be advantageous, when the circuit controls the fall of the voltage from the overvoltage down to the holding voltage for a measuring tube diameter of DN=10 to DN=100 in such a manner that the voltage is set to the holding voltage within a time interval of 20 to 900 µs, preferably 30 to 800 µs, with an accuracy of ±2 V, preferably ±0.2 V.

In the case of greater nominal diameters, it is advantageous, when the circuit controls the fall of the voltage from the overvoltage down to the holding voltage for a measuring tube diameter of DN>100 to DN=2400 in such a manner that the voltage is set to the holding voltage within a time interval of 600 to 10000 µs, preferably 750 to 8000 µs, with an accuracy of ±2 V, preferably ±0.2 V. It is advantageous, when the time interval between two intermediate desired values amounts to at least 0.05 µs, preferably at least 0.3 µs, in order to avoid an occurrence of small eddy current effects by too fast changing of intermediate desired values.

An especially favorable form of voltage drop is in the form of a polynomial or exponential function.

The circuit can be implemented in advantageous compact construction with at least one control apparatus, at least one D/A converter, a voltage supply and an A/D converter.

For checking the attenuation of eddy currents, the circuit can additionally measure, respectively ascertain, electrical current level as a function of time.

It is advantageous, when the control of the fall of the overvoltage to the holding voltage occurs by tuning the voltage to the at least two or more predetermined, intermediate, desired values III, IV with a faster tuning to an epsilon-band of a static magnetic field than in the case of a direct switching of the overvoltage to the holding voltage, wherein the epsilon-band has a standard deviation of ±1% of an actual value of the time-dependent magnetic field produced by the coil arrangement from a desired value of the steady magnetic field. In this way, as a whole, a faster reverse poling and a faster measurement sequence can be achieved.

BRIEF DESCRIPTION OF THE DRAWINGS

A preferred example of an embodiment will now be explained in greater detail based on the drawing, the figures of which show as follows.

DETAILED DISCUSSION IN CONJUNCTION WITH THE DRAWINGS

Figure 1A:
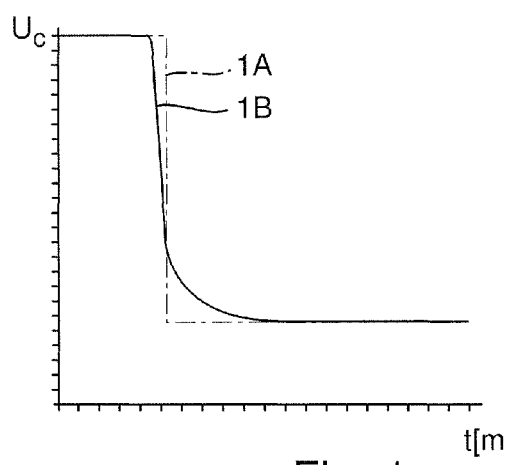
FIG. 1a is a graph of coil voltage versus time showing two different voltage curves.

FIG. 1a shows optimized portions of first and second voltage curves 1A and 1B in the case of operating a coil arrangement. Here, the first voltage curve 1A corresponds to an embodiment of the invention and the second voltage curve 1B to an embodiment according to the state of the art, in the case of which a direct switching of an overvoltage to a holding voltage occurs.

A corresponding coil arrangement is used in a magneto-inductive flow measuring device. The optimized voltage curve shown in FIG. 1a is designed for a DN 600 measuring tube.

Construction and measuring principle of a magneto-inductive flow measuring device are basically known. According to Faraday's law of induction, a voltage is induced in a conductor, which moves in a magnetic field. In the case of the magneto-inductive measuring principle, the flowing measured material corresponds to the moved conductor. A magnetic field of constant strength is produced by two field coils on both sides of a measuring tube. Located perpendicularly thereto on the tube inner wall of the measuring tube are two measuring electrodes, which tap the voltage produced by the flow of the measured substance. The induced voltage is proportional to the flow velocity and therewith to the volume flow. The magnetic field produced by the field coils results from a clocked direct current of changing polarity. This assures a stable zero-point and makes the measuring insensitive to influences resulting from multi-phase materials, inhomogeneities in the liquid or low conductivity. Known are magneto-inductive flow measuring devices with coil arrangements with more than two field coils and magneto-inductive flow measuring devices with other geometrical arrangements.

The voltage for operating the coil arrangement is preset to a predetermined voltage curve by a control apparatus arranged in the flow measuring device. Alternatively, the control apparatus can also be arranged outside of the flow measuring device and control the coil voltage via an electronic connection or a wireless connection.

It is known that during operation of a magneto-inductive flow meter a clocked reverse poling of the coils occurs, so that a voltage curve occurs, which lies half in the positive field and half in the negative field. To simplify the explanation, in the following, only the voltage curve in the periodically returning, positive field is described. Here, the voltage curve 1A of the example of an embodiment of the invention is described for a nominal diameter of DN 600.

In such case, first of all, the voltage of some starting point I, which lies, for example, at 0V or in the negative field, is increased to an overvoltage value II by supply of an electrical current. This rise happens quickly. Upon reaching the overvoltage value II, the electrical current supplied is lessened, whereby, due to eigenoscillation of the coils, there is a transient approach to the electrical current proportional voltage at or near the overvoltage value II. The rise to the overvoltage value occurs preferably in a monotonic manner.

After reaching the overvoltage value II, the voltage can either be held or a fall to a holding voltage V can occur directly, respectively be initiated.

A transient approach to the overvoltage value II is a preferred optional setting of the control apparatus. Understood as transient behavior are, in such case, deviations from the overvoltage value II due to the self-inductance of the coil, which decay with time. This can in the simplest case be a one-time increasing of the voltage over the overvoltage value II and a following fall to the overvoltage value II. In such case, the control apparatus is set in such a manner that upon reaching the overvoltage value II again a further fall of the voltage occurs.

Alternatively, also a multiple exceeding and subceeding of the overvoltage value II can occur during the holding of the voltage.

Following tuning to the overvoltage value II, a lessening of the voltage to a first intermediate desired value III occurs. This intermediate desired value III is predetermined by the control apparatus.

The voltage curve during this lessening is in the present example of an embodiment strongly monotonic. The means that the voltage value following the preceding voltage value is always less and not equal to or greater than the preceding voltage value. In such case, the control apparatus is correspondingly embodied, in order to enable this strongly monotonic fall to the intermediate value III. After reaching this first intermediate desired value III, there occurs the tuning of the voltage to a second intermediate desired value IV.

The two intermediate desired values shown in FIG. 1a are, however, only symbolic for about 100-400 intermediate desired values following one after the other until the holding voltage is reached.

In the case of measuring tubes with lesser nominal diameters, e.g. DN 50, starting from the intermediate value III, even a small rise to the holding voltage IV can occur.

The control circuit can tune the actual voltage curve according to the optimized voltage curve illustrated in FIG. 1a.

The subsection of the voltage curve 1A, which stands for the fall to an intermediate value III, is especially the solution of an optimal control problem. This control problem is solved for the eddy current equation based on Maxwell's equations preferably in the following manner:

$$F(A, u) := \frac{\lambda_T}{2} \int_\Omega (curl A(T) - curl A_0)^2 \, dx + \frac{\lambda_Q}{2} \int_\Omega (curl A(T) - curl A_0)^2 \, dx dt + \frac{\lambda_U}{2} \int_0^T u(t)^2 \, dt \to \min$$

This function is minimized with the following constraints $$\dot{\sigma} A + curl \mu^{-1} curl A - j = 0, \ldots \text{ wherein } A(0) = -A_0 \text{ in } \Omega \quad \text{(constraint 1)}$$

$$\frac{N_c}{A_c} \int_{\Omega_C} \dot{A}(t) \cdot w \, dx + R_c i_c(t) = u_c(t), \ldots \text{ wherein } i_c \text{ of } 0 = i_0, \quad \text{(constraint 2)}$$

wherein
T=end time
A=vector potential for reformulating Maxwell's ansatz
σ=conductivity
μ=magnetic permeability
$N_C$=number of windings of a coil
$A_C$=coil cross-section
$R_C$=coil resistance
j=electrical current density
U=coil voltage at the point in time t
Ω=computational region, typically a subregion of a three-dimensional space $\lambda_T$, $\lambda_U$ and $\lambda_Q$=weighting parameters (positive numbers)
$Q=\Omega \times (0 \ldots t)$
curl=rot
$+/-A_0$=magnetic field (starting and ending states)
x=location variable
t=time
$\dot{A}$=time derivative of A
$I_0$=coil current Based on the above set forth function, the curve for the coil voltage $u_c$ can be ascertained in a time interval.

Figure 1B:
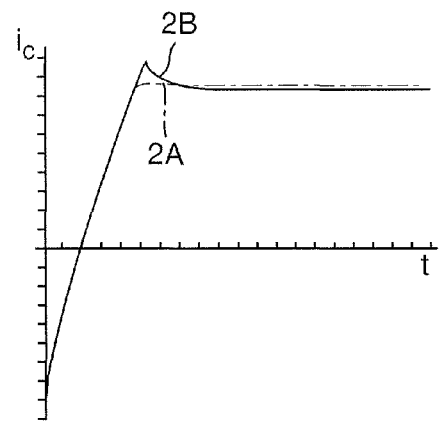
FIG. 1b is a graph of coil current versus time showing two different electrical current curves.

The desired effect of the control for an attenuation of eddy current effects can be explained in greater detail based on FIG. 1b. FIG. 1b shows the first and second electrical current curves 2A and 2B corresponding to the first and second voltage curves 1A and 1B.

As recognizable based on FIG. 1b, the electrical current curve 2A moves after a rise relatively rapidly to a constant electrical current end value. This electrical current curve 2A corresponds to the voltage curve 1A of the example of an embodiment according to the invention.

The second electrical current curves 2B corresponds to the voltage curve 1B for a direct switching from overvoltage to holding voltage. As one can see from FIG. 1b, there is after reaching the electrical current end value an additional increasing of the electrical current level and then a fall—until a constant electrical current end value is established. This increasing above the electrical current end value is significant for the self inductance of the coil and for an occurrence of eddy currents.

Figure 1C:
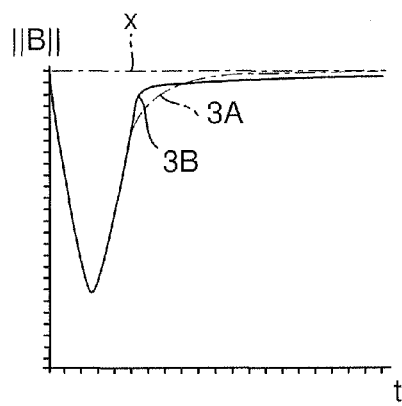
FIG. 1c is a graph of the B-field versus time showing the curves of two different magnetic fields.

The effects of the two electrical current curves shown in FIG. 1b on the time curves of magnetic fields is shown in FIG. 1c. FIG. 1c shows first and second curves for respective first and second magnetic fields. The first curve of a first magnetic field 3A corresponds, in such case, to the first electrical current curve 2A and to the first voltage curve 1A. In such case, the dashed line X represents an end value, which the magnetic field should achieve.

The second curve of the second magnetic field 3B corresponds to the second electrical current curve 2B and to the second voltage curve 1B.

As one can see from FIG. 1c, the rise of the second curve 3B after passing through a minimum is, indeed, at the start, steeper. However, this curve 3B requires, subsequently, an essentially longer time for reaching the end value X than the first curve 3A of the first magnetic field.

Figure 1D:
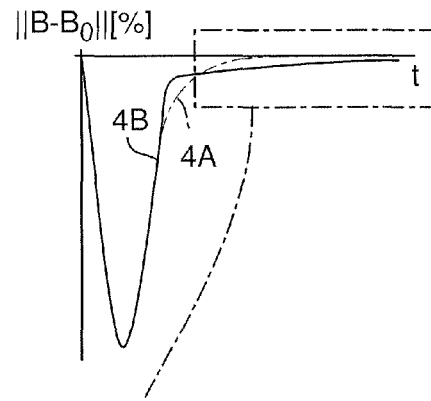
FIG. 1d is a graph of the deviations of the curves of FIG. 1c from an end value.
Figure 1E:
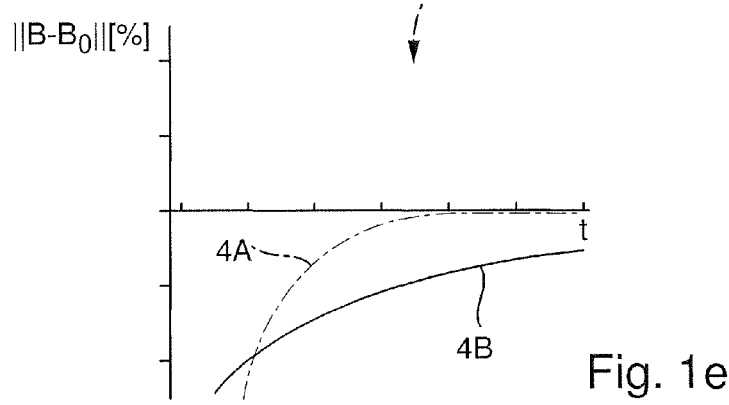
FIG. 1e is an enlarged section of FIG. 1d.

FIG. 1d shows the time deviation of the first and second magnetic fields B(t) from the end value $B_0$. FIG. 1e provides an enlargement of the terminal region of FIG. 1d. When the magnetic field B(t) reaches the end value $B_0$, the deviation is 0%. A stable magnetic field is present, to the extent that the deviation of the magnetic field B(t) from the end value $B_0$ amounts to ±1%. This region of the graph is defined by a so-called epsilon-band. As one can see, the first curve requires significantly less time for reaching this epsilon-band.

It has, thus, been found, surprisingly, that a controlling of the fall of the supply voltage compared with a direct switching requires, indeed, first of all, more time for reaching the holding voltage. However, this apparent disadvantage enables an essentially faster tuning to a stable magnetic field, due to the attenuation of eddy currents.

Figure 2:
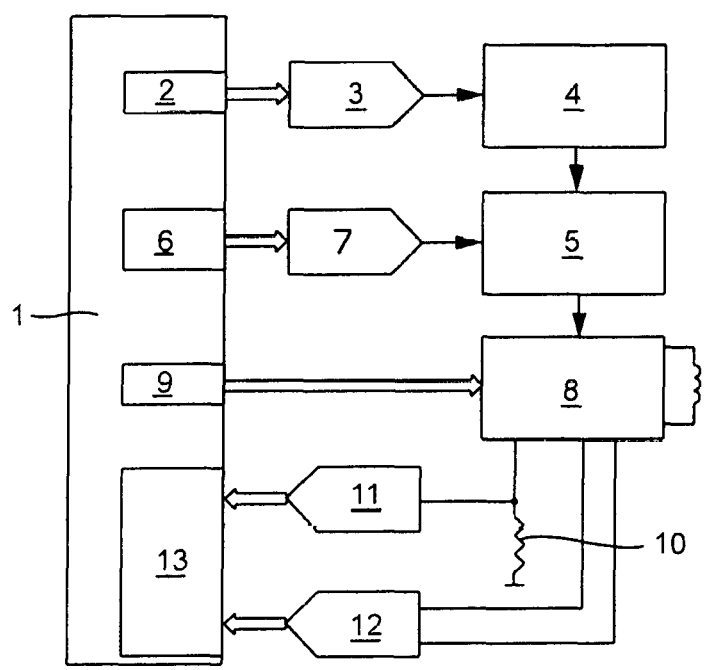
FIG. 2 is a simplified circuit in the form of a block diagram of a control apparatus for operating the coil arrangement.

A corresponding control circuit can be composed of an arrangement, such as shown in FIG. 2.

FIG. 2 includes a control apparatus 1 as a component of the control circuit. Integrated in the control apparatus 1 is a first memory unit 2, which outputs a default value for a supply voltage, respectively a feeding voltage.

This predetermined value of a supply voltage is transmitted to a digital/analog converter 3, which converts the digital signal into an analog signal. This signal is transmitted as desired value to a variable supply voltage source 4, which outputs a preset feeding voltage corresponding to the desired value. The feeding voltage is transmitted to a coil voltage controller 5. Coil voltage controller 5 is supplied via a second memory unit 6 integrated in the control apparatus 1 with a desired value, which is converted earlier by a digital/analog converter into an analog signal. Fine tuning of the preset feeding voltage occurs in the coil voltage controller 5. The desired value predetermined by the integrated second memory unit 6 corresponds as a function of time to the voltage curve illustrated in FIG. 1.

Transmitted to the coil voltage controller 5, in such case likewise through a digital/analog converter 7, is a desired voltage, which corresponds to the voltage illustrated in FIG. 1. This voltage is stored in the memory 6 of the control apparatus 1 and is provided to the coil voltage controller 5 for tuning the feeding voltage.

The coil voltage controller 5 forwards a coil voltage to an H-bridge circuit 8. The H-bridge circuit 8 executes a clock signal change and serves to define the electrical current direction. Output are a coil current and a coil voltage, with which the coil arrangement is operated for producing a magnetic field. In conjunction therewith, the coil current and the coil voltage are converted by means of respective analog/digital converters into digital signals and evaluated by the control apparatus 1.

The desired value is, in such case, taken from the FIG. 1 illustrated curve, which in the concrete case represents a function, which depends at least on the magnet system geometry, the material properties of the measuring tube, the conductivity of the pole shoes, the field guide-back sheet metal, the B-H curve of the magnetic field and the resistance of the n-coils, wherein n is the number of coils. The function includes additionally an upper limit value, which is less than or equal to the overvoltage value.

Therefore, it is advantageous, when the supply voltage is set based on a time-dependent desired value, which follows the voltage curve, wherein the voltage curve contains the dependence of the voltage
  a) on the geometric arrangement of the magnet system arranged in the magneto-inductive flow measuring device;
  b) on the conductivity and magnetic permeability of the field guide-back sheet metal pieces and pole shoes
  c) on the resistances of the n-coils of the coil arrangement.

Figure 3A:
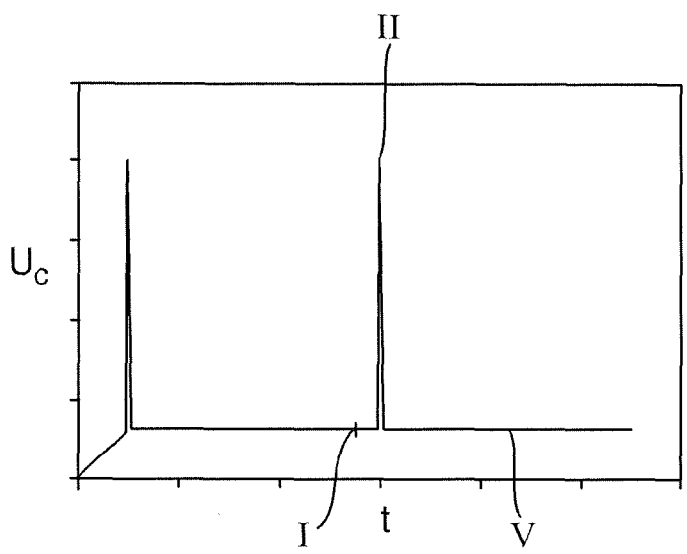
FIG. 3a is a graph of an additional voltage curve.
Figure 3B:
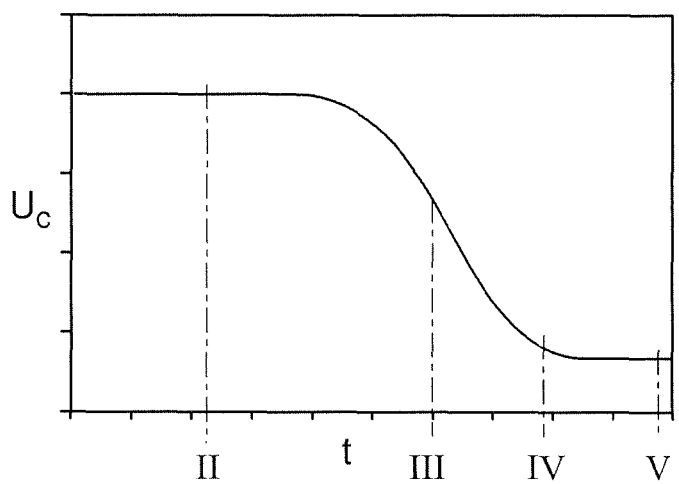
FIG. 3b is a graph of an additional voltage curve in enlarged form.

FIGS. 3a and 3b show a further example of an embodiment for a predetermined voltage curve, which, however, extends less optimally in comparison to FIG. 1a. In such case, FIG. 3b is a section of FIG. 3a.

The invention claimed is:

1. A magneto-inductive flow measuring device, comprising:
  a coil arrangement; and
  a circuit for controlling a supply voltage of said coil arrangement, wherein:
  said circuit is designed to provide the supply voltage of said coil arrangement with a voltage curve sequenced as follows:
  A) the voltage rises from a starting voltage I up to an overvoltage II;
  B) in given cases, the voltage is held at the overvoltage II;
  C) the voltage falls from the overvoltage II down to a holding voltage V;

said circuit controls the fall of the voltage from the overvoltage down to the holding voltage by tuning the voltage to at least two or more predetermined, intermediate, values III, IV, wherein:
the control of the fall of the overvoltage to the holding voltage occurs by tuning the voltage to the at least two or more predetermined, intermediate, values III, IV with a faster tuning to an epsilon-band of a static magnetic field than in the case of a direct switching of the overvoltage to the holding voltage; and
said epsilon-band has a standard deviation ±1% of an actual value of the time-dependent magnetic field produced by the coil arrangement from an end value of the steady magnetic field.

2. The magneto-inductive flow measuring device as claimed in claim 1, wherein:
said circuit controls the fall of the voltage from the overvoltage down to the holding voltage by tuning the voltage to at least five, preferably at least ten, predetermined, intermediate, values III, IV.

3. The magneto-inductive flow measuring device as claimed in claim 1, wherein:
said circuit controls the fall of the voltage from the overvoltage down to the holding voltage for a measuring tube diameter of DN=10 millimeter to DN=100 millimeter in such a manner that the voltage is set to the holding voltage within a time interval of 20 to 900 µs, with an accuracy of ±2 V.

4. The magneto-inductive flow measuring device as claimed in claim 1, wherein:
said circuit controls the fall of the voltage from the overvoltage down to the holding voltage for a measuring tube diameter of DN>100 millimeter to DN=2400 millimeter in such a manner that the voltage is set to the holding voltage within a time interval of 600 to 10000 µs, with an accuracy of ±2 V.

5. The magneto-inductive flow measuring device as claimed in claim 1, wherein:
the time interval between two intermediate predetermined values amounts to at least 0.05 µs, preferably at least 0.3 µs.

6. The magneto-inductive flow measuring device as claimed in claim 1, wherein:
a subsection of the voltage curve, which describes the fall of the supply voltage according to subparagraph C, has the form of a polynomial.

7. The magneto-inductive flow measuring device as claimed in claim 1, wherein:
a subsection of the voltage curve, which describes the fall of the supply voltage according to subparagraph C has the form of an exponential function.

8. The magneto-inductive flow measuring device as claimed in claim 1, wherein:
said circuit has at least one control apparatus, at least one D/A converter, a voltage supply and an A/D converter.

9. The magneto-inductive flow measuring device as claimed in claim 1, wherein:
said circuit additionally measures electrical current level as a function of time.

10. The magneto-inductive flow measuring device as claimed in claim 3, wherein:
said circuit controls the fall of the voltage from the overvoltage down to the holding voltage for a measuring tube diameter of DN=10 millimeter to DN=100 millimeter in such a manner that the voltage is set to the holding voltage within a time interval of 30 to 800 µs, with an accuracy of ±2 V.

11. The magneto-inductive flow measuring device as claimed in claim 3, wherein:
said circuit controls the fall of the voltage from the overvoltage down to the holding voltage for a measuring tube diameter of DN=10 millimeter to DN=100 millimeter in such a manner that the voltage is set with an accuracy of ±0.2 V.

12. The magneto-inductive flow measuring device as claimed in claim 6, wherein:
said circuit controls the fall of the voltage from the overvoltage down to the holding voltage for a measuring tube diameter of DN>100 millimeter to DN=2400 millimeter in such a manner that the voltage is set to the holding voltage within a time interval of 750 to 8000 µs, with an accuracy of ±2 V.

13. The magneto-inductive flow measuring device as claimed in claim 6, wherein: said circuit controls the fall of the voltage from the overvoltage down to the holding voltage for a measuring tube diameter of DN>100 millimeter to DN=2400 millimeter in such a manner that the voltage is with an accuracy of ±0.2 V.

* * * * *